United States Patent
Lin

(10) Patent No.: US 11,128,427 B2
(45) Date of Patent: Sep. 21, 2021

(54) METHOD FOR DETERMINING CHANNEL RESOURCES AND APPARATUS

(71) Applicant: GUANGDONG OPPO MOBILE TELECOMMUNICATIONS CORP., LTD., Guangdong (CN)

(72) Inventor: Yanan Lin, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/893,767

(22) Filed: Jun. 5, 2020

(65) Prior Publication Data

US 2020/0304267 A1    Sep. 24, 2020

Related U.S. Application Data

(63) Continuation of application No. PCT/CN2018/081918, filed on Apr. 4, 2018.

(51) Int. Cl.
*H04L 5/00* (2006.01)

(52) U.S. Cl.
CPC ................... *H04L 5/0053* (2013.01)

(58) Field of Classification Search
CPC .................................... H04L 5/0053
See application file for complete search history.

(56) References Cited

U.S. PATENT DOCUMENTS

| | | |
|---|---|---|
| 9,161,349 B2 | 10/2015 | Yang |
| 9,642,160 B2 | 5/2017 | Yang et al. |
| 9,967,868 B2 | 5/2018 | Yang et al. |
| 2013/0170463 A1 | 7/2013 | Yang |
| 2015/0334741 A1 | 11/2015 | Yang et al. |
| 2017/0196004 A1 | 7/2017 | Yang et al. |
| 2017/0245262 A1 | 8/2017 | Nayeb Nazar |
| 2018/0167931 A1* | 6/2018 | Papasakellariou .... H04L 1/1854 |
| 2018/0167935 A1* | 6/2018 | Yan ........................ H04L 5/0094 |
| 2018/0220413 A1* | 8/2018 | Yang ..................... H04L 1/0041 |

(Continued)

FOREIGN PATENT DOCUMENTS

| | | |
|---|---|---|
| CN | 101340383 A | 1/2009 |
| CN | 104284425 A | 1/2015 |

(Continued)

OTHER PUBLICATIONS

Vivo."Remaining Issues on PUCCH Resource Allocation" R1-1800203, Jan. 22, 2018(Jan. 22, 2018),pp. 4-6.

(Continued)

*Primary Examiner* — Jason E Mattis
(74) *Attorney, Agent, or Firm* — Perkins Coie LLP

(57) ABSTRACT

A method for determining a channel resource includes that: determining a target Physical Uplink Control Channel (PUCCH) resource set in accordance with a total number of Uplink Control Information (UCI) bit for uplink transmission; and obtaining a target PUCCH resource from the target PUCCH resource set. The total number of the UCI bit includes a total number of a first part of information bit and a maximum value in a value range, with multiple values, of a number of a second part of information bit. A UCI corresponding to the total number of the UCI bit includes a first part of information and a second part of information.

9 Claims, 2 Drawing Sheets

(56) References Cited

U.S. PATENT DOCUMENTS

2019/0207667 A1* 7/2019 Zhou .................... H04B 7/0626
2019/0230650 A1* 7/2019 Kim ..................... H04L 1/0026

FOREIGN PATENT DOCUMENTS

CN          106850154 A     6/2017
CN          107005374 A     8/2017

OTHER PUBLICATIONS

Ericsson."On UCI on PUSCH" R1-1718638, Oct. 3, 2017 (Oct. 3, 2017), section 2.2.1.
International Search Report in the international application No. PCT/CN2018/081918, dated Jan. 4, 2019.
Ericsson, Partial overlapping of PUCCH resources, Discussion and Decision, 3GPP TSG RAN WG1 Meeting #92, R1-1803531, Feb. 26-Mar. 2, 2018 (Dec. 26 2018-Mar. 2).
Written Opinion of the International Search Authority in the international application No. PCT/CN20181081918, dated Jan. 4, 2019.
LG Electronics: "Remaining issues on long-duration PUCCH", 3GPP Draft: R1-1802211-Remaining Issues on Long-Duration PUCCH, 3rd Generation Partnership Project (3GPP), Mobile Competence Centre; 650, Route des Lucioles; F-06921 Sophia-Antipolis Cedex; France, vol. RAN WG1, No. Athens, Greece; Feb. 26, 2018-Mar. 2, 2018 Feb. 16, 2018 (Feb. 16, 2018), XP051397216, Retrieved from the Internet: URL: http://www.3gpp. org/ftp/tsg%5Fran/WG1%5FRL1/TSGR1 %5F92/Docs/, [retrieved on Feb. 16, 2018].
Ericsson: "On UE Behavior for UCI Reporting and Other Issues", 3GPP Draft; R1-1800947, 3rd Generation Partnership Project (3GPP), Mobile Competence Centre ; 650, Route des Lucioles ; F-06921 Sophia-Antipolis Cedex ; France, vol. RAN WG1, No. Vancouver, Canada; Jan. 22, 2018-Jan. 26, 2018 Jan. 13, 2018 (Jan. 13, 2018), XP051385180, Retrieved from the Internet: URL: http://www.3gpp.org/tp/tsg%5Fran/WG1 % 5FRL1/TSGR1 %5FAH/NR%5FAH%5F1801/Docs/, [retrieved on Jan. 13, 2018].
Catt: "Multiplexing of UCI transmissions of different durations or configurations", 3GPP Draft: R1-1801731, 3rd Generation Partnership Project (3GPP), Mobile Competence Centre; 650, Route des Lucioles: F-06921 Sophia-Antipolis Cedex; France, vol. RAN WG1, No. Athens, Greece; Feb. 26, 2018-Mar. 2, 2018 Feb. 17, 2018 (Feb. 17, 2018), XP051397712, Retrieved from the Internet: URL: http://www.3gpp.org/ftp/tsg%5Fran/WG1%5FRL1/TSGR1%5F92/Docs/, [retrieved on Feb. 17, 2018].
Supplementary European Search Report in the European application No. 18913233.5, dated Oct. 20, 2020.
3GPP TSG RAN WG1 Meeting #91 R1-1720686, Reno, US Nov. 27-Dec. 1, 2017; Agenda item: 7.3 2.4; Source: Qualcomm Incorporated; Title: Resource allocation for PUCCH.
3GPP TSG RAN WG1 #92 R1-1801979, Athens, Greece, Feb. 26-Mar. 2, 2018; Agenda item: 7.1.3.2.2; Source: Samsung; Title: Corrections on PUCCH for more than 2 Symbols.
3GPP TS 38.213 V1.32.010 (2017-121), 3rd Generation Partnership Project; Technical Specification Group Radio Access Network; NR; Physical layer procedures for control (Release 15).
First Office Action of the Chinese application No. 202010340672.2, dated May 12, 2021.
"3rd Generation Partnership Project; Technical SpecificaAtion Group Radio Access Network; NR; Physical layer procedures for control (Release 15)", 3GPP Draft; R1-1803554 TS 38.213 V15.0.1, Mar. 15, 2018(Mar. 15, 2018), XP051412758.
First Office Action of the European application No. 18913233.5, dated Jul. 27, 2021.

* cited by examiner

METHOD FOR DETERMINING CHANNEL RESOURCES AND APPARATUS

CROSS-REFERENCE TO RELATED APPLICATION

This application is a U.S. continuation application of International Application No. PCT/CN 2018/081918, entitled "METHOD FOR DETERMINING CHANNEL RESOURCES, DEVICE, AND COMPUTER STORAGE MEDIUM", filed on Apr. 4, 2018, the disclosure of which is hereby incorporated by reference in its entirety.

BACKGROUND

In a 5th Generation (5G) New Radio (NR) system, a base station, for example, a 5G base station (gNB), may configure multiple available Physical Uplink Control Channel (PUCCH) resource sets for a terminal through high-layer signaling, and each PUCCH resource set includes multiple PUCCH resources. The terminal determines the PUCCH resource set for feedback transmission according to the number of bits of feedback information. However, it is impossible for the base station to accurately learn about the PUCCH resource set for feedback transmission of the terminal, resulting in the circumstance of different comprehension between the base station and the terminal. This is a problem that needs to be solved at present.

SUMMARY

The embodiments of the disclosure are intended to provide an apparatus in wireless communication and a method for determining a channel resource.

According to a first aspect, the embodiments of the disclosure provide an apparatus in wireless communication, configured to: determine a target Physical Uplink Control Channel (PUCCH) resource set in accordance with a total number of Uplink Control Information (UCI) bit for uplink transmission; and obtain a target PUCCH resource from the target PUCCH resource set. The total number of the UCI bit includes: a total number of a first part of information bit and a maximum value in a value range, with multiple values, of a number of a second part of information bit. A UCI corresponding to the total number of the UCI bit includes: a first part of information and a second part of information.

According to a second aspect, the embodiments of the disclosure provide a method for determining a channel resource, which includes the following operations. A target Physical Uplink Control Channel (PUCCH) resource set is determined in accordance with a total number of Uplink Control Information (UCI) bit for uplink transmission. A target PUCCH resource is obtained from the target PUCCH resource set. The total number of the UCI bit includes: a total number of a first part of information bit and a maximum value in a value range, with multiple values, of a number of a second part of information bit. A UCI corresponding to the total number of the UCI bit includes: a first part of information and a second part of information.

DETAILED DESCRIPTION

For making the characteristics and technical contents of the embodiments of the disclosure understood in more detail, implementation of the embodiments of the disclosure will be described below in combination with the drawings in detail. The drawings are only adopted for description as references and not intended to limit the embodiments of the disclosure.

Figure 1:
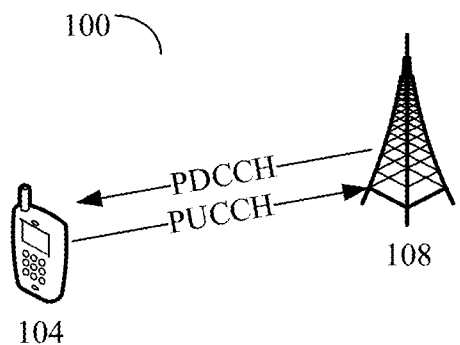
FIG. 1 is a schematic diagram of an exemplary network environment according to an embodiment of the disclosure.

Referring to FIG. 1, a network environment 100 applied to each embodiment of the application is shown. The network environment 100 includes UE 104 wirelessly coupled to a Radio Access Network (RAN) 108. Specifically, the RAN 108 may be a base station 108, for example, an Evolved Node B (eNB) or a 5G base station gNB. The base station 108 is configured to communicate with the UE 104 through an Over The Air (OTA) interface.

In FIG. 1, the UE 104 may also be called a terminal device, an access terminal, a user unit, a user station, a mobile radio station, a mobile station, a remote station, a remote terminal, a mobile device, a user terminal, a terminal, an apparatus in wireless communication, a user agent or a user device. The terminal device may be a Station (ST) in a Wireless Local Area Network (WLAN), and may be a cell phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, a vehicle-mounted device, a wearable device, or a terminal device in a next-generation communication system, for example, a terminal device in a 5G network, a terminal device in a future evolved Public Land Mobile Network (PLMN) or the like. In the embodiment of the disclosure, the terminal device may also be a wearable device. The wearable device may also be called a wearable intelligent device and is a generic term for wearable devices obtained by performing intelligentization designing and development on daily wearing products, for example, glasses, gloves, watches, clothes and shoes.

For the network environment 100 shown in FIG. 1, it is to be noted that downlink physical channels include a Physical Downlink Control Channel (PDCCH) for carrying Downlink Control Information (DCI) and, similarly, uplink physical channels also include a PUCCH for carrying Uplink Control Information (UCI). For the UCI, all contents therein are information related to a current state of UE. Therefore, the UE is required to feed back the UCI to the base station through the PUCCH when the base station cannot obtain such information.

In a feedback process, the base station 108 may configure S candidate PUCCH resource sets for the terminal through high-layer signaling, S being not greater than 4. Each PUCCH resource set includes multiple PUCCH resources. For example, S=4. In such case, in the embodiment of the disclosure, the four candidate PUCCH resource sets are sequentially numbered, i.e., a PUCCH resource set 1, a PUCCH resource set 2, a PUCCH resource set 3 and a PUCCH resource set 4 respectively. For the four PUCCH resource sets, a bit length of UCI that can be carried by each candidate PUCCH resource set increases with the increase of the number. Generally speaking, the bit length of the UCI that can be carried by the PUCCH resource set 1 is not greater than 2, the bit length of the UCI that can be carried by the PUCCH resource set 2 is greater than 2 but less than $N_2$, a value of $N_2$ being configured through the high-layer signaling, the bit length of the UCI that can be carried by the PUCCH resource set 3 is more than or equal to $N_2$ but less than $N_3$, a value of $N_3$ being configured through the high-layer signaling, and the bit length of the UCI that can be carried by the PUCCH resource set 4 is more than or equal to $N_3$ but less than $N_4$, a value of $N_4$ being configured through the high-layer signaling or predetermined in a protocol.

The UE 104, after obtaining the S candidate PUCCH resource sets based on a signaling configuration from the base station 108, may determine the PUCCH resource set for sending the UCI according to a bit length of the UCI to be fed back and the bit length of the UCI that can be carried by each candidate PUCCH resource set.

The UCI may usually include an uplink Scheduling Request (SR), a Hybrid Automatic Repeat reQuest (HARQ) Acknowledgment (ACK)/Negative Acknowledgment (NACK) and Channel State Information (CSI). For the CSI, the CSI in a present NR system consists of two parts, the part 1 CSI including a channel Rank Indication (RI), a CSI Reference Signal Resource Indicator (CRI) and a Channel Quality Indicator (CQI) of a first codeword, and the part 2 CSI including a Precoding Matrix Indicator (PMI) and a CQI of a second codeword. For the part 2, the CQI of the second codeword is related to a value of the RI and the CQI of the second codeword exists only when the RI is greater than 4. Therefore, a bit length of the part 2 is required to be determined according to the value of the RI in the part 1. Based on this, the base station, before receiving the UCI, may not accurately learn about the bit length of the part 2 CSI. Consequently, when the UE sends the UCI, the base station may not learn about the PUCCH resource set determined by the UE to send the UCI, resulting in the circumstance of different comprehension between the base station and the UE due to different comprehension of the base station and the UE to the PUCCH resource set.

For this circumstance, the application proposes the following embodiments.

First Embodiment

Figure 2:
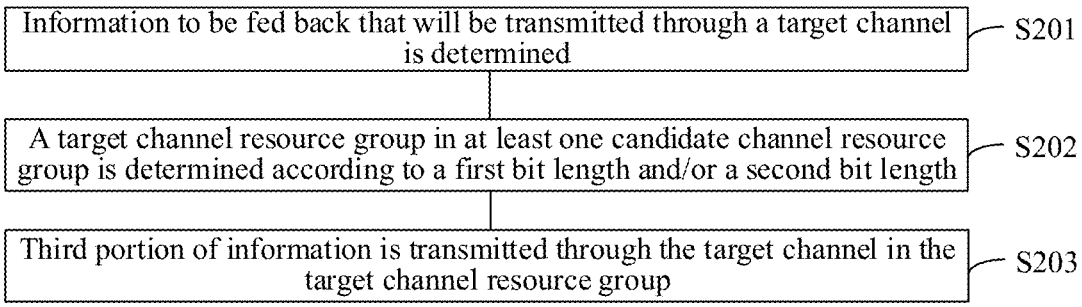
FIG. 2 is a flowchart of a method for determining a channel resource according to an embodiment of the disclosure.

Referring to FIG. 2, a method for determining a channel resource provided in the embodiment of the disclosure is shown. The method may be applied to UE. The method may include the following operations.

In S201, feedback information that will be transmitted in a target channel is determined.

The feedback information includes a first part of information and a second part of information, a bit length of the first part of information is invariable, and a bit length of the second part of information is variable.

In S202, a target channel resource set from at least one candidate channel resource set is determined according to a first bit length and/or a second bit length.

The first bit length is the bit length of the first part of information, and the second bit length is a bit length value within a value range of the bit length of the second part of information.

In S203, a third part of information is transmitted in the target channel in the target channel resource set, the third part of information being a subset or complete set of the feedback information.

According to the technical solution shown in FIG. 2, it is elaborated a process in which the UE determines the target channel resource set in the configured candidate channel resource sets and then transmits the subset or complete set of the feedback information in the target channel in the target channel resource set. A base station may determine the target channel resource set used by the UE to transmit the subset or complete set of the feedback information according to the abovementioned process and determine a target channel based on the target channel resource set to receive the subset or complete set of the feedback information from the UE. Therefore, the circumstance of different comprehension of the base station and the UE to the channel resource set is avoided.

In the embodiment of the disclosure, the channel resource set may preferably be a PUCCH resource set and may also preferably be another channel resource set capable of transmitting UCI, for example, a Physical Uplink Shared Channel (PUSCH) resource set. There are no specific limits made thereto in the embodiment. However, for clearly elaborating the technical solution of the embodiment of the disclosure, the PUCCH channel resource set is taken as an example for description in the embodiment of the disclosure. It can be understood that the technical solution of the embodiment of the disclosure may also be applied to the PUSCH resource set and elaborations are omitted herein.

For the technical solution shown in FIG. 2, the feedback information includes UCI and a check code of the UCI. Specifically, the check code of the UCI may be a Cyclic Redundancy Check (CRC) code of the UCI. It can be understood that any other check code that can be used for error check of the UCI may be applied to the embodiment of the disclosure and elaborations are omitted herein. The UCI includes a first UCI and a second UCI, the first part of information includes the first UCI and the check code of the UCI, and the second part of information includes the second UCI. The first UCI may include at least one of: an ACK/NACK, an SR or a part 1 CSI. It can be understood that, in a specific implementation process, information in the part 1 CSI may refer to the abovementioned first part of the CSI and elaborations are omitted herein.

Correspondingly, the second UCI may be a part 2 CSI. Information in the part 2 CSI may specifically refer to the abovementioned second part of the CSI and elaborations are also omitted herein.

Based on the above description about the part 1 CSI and the part 2 CSI, it may be known that: the bit length of the first part of information is invariable, so the first bit length is the bit length of the first part of information; and the bit length of the second part of information is variable, so the second bit length is a bit length value within the value range of the bit length of the second part of information in the embodiment of the disclosure.

For the technical solution shown in FIG. 2, in a possible implementation, the operation that the target channel resource set from the at least one candidate channel resource set is determined according to the first bit length and/or the second bit length includes the following operations.

The target channel resource set from the at least one candidate channel resource set is determined based on the first bit length.

Alternatively, the target channel resource set from the at least one candidate channel resource set is determined based on a sum of the first bit length and the second bit length.

For the implementation, the operation that the target channel resource set from the at least one candidate channel resource set is determined based on the sum of the first bit length and the second bit length includes the following operations.

The target channel resource set from the at least one candidate channel resource set is determined based on the first bit length and a maximum value in the value range of the bit length of the second part of information.

The target channel resource set from the at least one candidate channel resource set is determined based on the first bit length and a minimum value in the value range of the bit length of the second part of information.

For example, the base station configures the abovementioned candidate PUCCH resource sets for the UE. The first bit length is compared with a bit length range of the UCI that can be carried by each candidate PUCCH resource set, and the candidate PUCCH resource set corresponding to the bit length range where the first bit length is located is determined as the target channel resource set.

In addition, the sum of the first bit length and the maximum value in the value range of the bit length of the second part of information may be compared with the bit length range of the UCI that can be carried by each candidate PUCCH resource set, and the candidate PUCCH resource set corresponding to the bit length range where the sum of the first bit length and the maximum value in the value range of the bit length of the second part of information is located is determined as the target channel resource set.

Alternatively, the sum of the first bit length and the minimum value in the value range of the bit length of the second part of information is compared with the bit length range of the UCI that can be carried by each candidate PUCCH resource set, and the candidate PUCCH resource set corresponding to the bit length range where the sum of the first bit length and the minimum value in the value range of the bit length of the second part of information is located is determined as the target channel resource set.

For the technical solution shown in FIG. 2, in a possible implementation, the operation that the target channel resource set from the at least one candidate channel resource set is determined according to the first bit length and/or the second bit length includes the following operations.

If a sum of the first bit length and the minimum value in the value range of the bit length of the second part of information is more than or equal to an upper limit of a bit length that can be carried by the at least one candidate channel resource set, the set capable of carrying a largest bit length in the at least one candidate channel resource set is determined as the target channel resource set.

Alternatively, if the sum of the first bit length and the minimum value in the value range of the bit length of the second part of information is less than or equal to the upper limit of the bit length that can be carried by the at least one candidate channel resource set, the target channel resource set from the at least one candidate channel resource set is determined based on the sum of the first bit length and the minimum value in the value range of the bit length of the second part of information.

Specifically, for the implementation, as described above, the base station configures candidate PUCCH resource sets for the UE through the high-layer signaling, it may be seen that the base station may configure the PUCCH resource set 1, the PUCCH resource set 2, the PUCCH resource set 3 and the PUCCH resource set 4 for the UE in order according to the bit length of the UCI that it can carry. It can be seen that the last PUCCH resource set configured for the UE by the base station may be considered as a PUCCH resource set capable of carrying the largest bit length in the candidate PUCCH resource sets. Moreover, the upper limit of the bit length that can be carried by the candidate channel resource set is a maximum value of the bit length that can be carried by the PUCCH resource set capable of carrying the largest bit length in the candidate PUCCH resource sets. Therefore, if the sum of the first bit length and the minimum value in the value range of the bit length of the second part of information is more than or equal to the upper limit of the bit length that can be carried by the at least one candidate channel resource set, it is indicated that the feedback information of the UE may only be transmitted through the set capable of carrying the largest bit length in the candidate PUCCH resource sets. If the sum of the first bit length and the minimum value in the value range of the bit length of the second part of information is less than or equal to the upper limit of the bit length that can be carried by the at least one candidate channel resource set, it is indicated that the feedback information of the UE may not necessarily be transmitted through the set capable of carrying the largest bit length in the candidate PUCCH resource sets. Therefore, the candidate PUCCH resource set corresponding to the bit length range where the sum of the first bit length and the minimum value in the value range of the bit length of the second part of information is located may be determined as the target channel resource set according to the specific description about the abovementioned implementation.

For the technical solution shown in FIG. 2, in a possible implementation, the operation that the target channel resource set from the at least one candidate channel resource set is determined according to the first bit length and/or the second bit length includes the following operation.

If a sum of the first bit length and the maximum value in the value range of the bit length of the second part of information is less than or equal to the upper limit of the bit length that can be carried by the at least one candidate channel resource set, the target channel resource set from the at least one candidate channel resource set is determined based on the sum of the first bit length and the maximum value in the value range of the bit length of the second part of information.

For the implementation, specifically, the sum of the first bit length and the maximum value in the value range of the bit length of the second part of information may be considered as a maximum value of a bit length of the feedback information. If the maximum value of the bit length of the feedback information is less than or equal to the upper limit of the bit length that can be carried by the at least one candidate channel resource set, it is indicated that the feedback information of the UE may not necessarily be transmitted through the set capable of carrying the largest bit length in the candidate PUCCH resource sets. Therefore, the candidate PUCCH resource set corresponding to the bit length range where the sum of the first bit length and the maximum value in the value range of the bit length of the second part of information is located may be determined as the target channel resource set according to the specific description about the abovementioned implementation.

For the technical solution shown in FIG. 2, in a possible implementation, the operation that the target channel resource set from the at least one candidate channel resource set is determined according to the first bit length and/or the second bit length includes the following operation.

If the sum of the first bit length and the maximum value in the value range of the bit length of the second part of information is more than or equal to the upper limit of the bit length that can be carried by the at least one candidate channel resource set and the sum of the first bit length and the minimum value in the value range of the bit length of the second part of information is less than or equal to the upper limit of the bit length that can be carried by the at least one candidate channel resource set, the target channel resource set from the at least one candidate channel resource set is determined based on the sum of the first bit length and the minimum value in the value range of the bit length of the second part of information.

For the implementation, specifically, the sum of the first bit length and the maximum value in the value range of the bit length of the second part of information may be considered as a maximum possible value of the bit length of the feedback information, and the sum of the first bit length and the minimum value in the value range of the bit length of the second part of information may be considered as a minimum possible value of the bit length of the feedback information. When the maximum possible value of the bit length of the feedback information is more than or equal to the upper limit of the bit length that can be carried by the at least one candidate channel resource set and the minimum possible value of the bit length of the feedback information is less than or equal to the upper limit of the bit length that can be carried by the at least one candidate channel resource set, the target channel resource set may be determined according to the minimum possible value of the bit length of the feedback information, that is, the candidate PUCCH resource set corresponding to the bit length range where the sum of the first bit length and the minimum value in the value range of the bit length of the second part of information is located is determined as the target channel resource set.

For the technical solution shown in FIG. 2, in a possible implementation, the operation that the target channel resource set from the at least one candidate channel resource set is determined according to the first bit length and/or the second bit length includes the following operation.

If the sum of the first bit length and the minimum value in the value range of the bit length of the second part of information is more than or equal to the upper limit of the bit length that can be carried by the at least one candidate channel resource set and the first bit length is more than or equal to the upper limit of the bit length that can be carried by the at least one candidate channel resource set, the set capable of carrying the largest bit length in the at least one candidate channel resource set is determined as the target channel resource set.

For the implementation mode, specifically, the sum of the first bit length and the minimum value in the value range of the bit length of the second part of information may be considered as the minimum possible value of the bit length of the feedback information. If the minimum possible value of the bit length of the feedback information is more than or equal to the upper limit of the bit length that can be carried by the at least one candidate channel resource set and the invariable first bit length is also more than or equal to the upper limit of the bit length that can be carried by the at least one candidate channel resource set, it is indicated that the feedback information of the UE may only be transmitted through the set capable of carrying the largest bit length in the candidate PUCCH resource sets.

For the technical solution shown in FIG. 2, in a possible implementation, the operation that the target channel resource set from the at least one candidate channel resource set is determined according to the first bit length and/or the second bit length includes the following operation.

If the sum of the first bit length and the minimum value in the value range of the bit length of the second part of information is more than or equal to the upper limit of the bit length that can be carried by the at least one candidate channel resource set and the first bit length is less than or equal to the upper limit of the bit length that can be carried by the at least one candidate channel resource set, the target channel resource set from the at least one candidate channel resource set is determined based on the first bit length.

For the implementation, specifically, the sum of the first bit length and the minimum value in the value range of the bit length of the second part of information may be considered as the minimum possible value of the bit length of the feedback information. If the minimum possible value of the bit length of the feedback information is more than or equal to the upper limit of the bit length that can be carried by the at least one candidate channel resource set, the candidate PUCCH resource set corresponding to the bit length range where the first bit length is located may be determined as the target channel resource set.

For the technical solution shown in FIG. 2, in a possible implementation, the operation that the target channel resource set from the at least one candidate channel resource set is determined according to the first bit length and/or the second bit length includes the following operations.

If the sum of the first bit length and the minimum value in the value range of the bit length of the second part of information is more than or equal to the upper limit of the bit length that can be carried by the at least one candidate channel resource set and the first bit length is more than or equal to the upper limit of the bit length that can be carried by the at least one candidate channel resource set, the target channel resource set from the at least one candidate channel resource set is determined based on a bit length of part of information in the first UCI, the part of information in the first UCI including the ACK/NACK and/or the SR.

Alternatively, if the sum of the first bit length and the minimum value in the value range of the bit length of the second part of information is more than or equal to the upper limit of the bit length that can be carried by the at least one candidate channel resource set and the first bit length is more than or equal to the upper limit of the bit length that can be carried by the at least one candidate channel resource set, the set capable of carrying the largest bit length in the at least one candidate channel resource set is determined as the target channel resource set.

For the implementation, specifically, the sum of the first bit length and the minimum value in the value range of the bit length of the second part of information may be considered as the minimum possible value of the bit length of the feedback information. If the minimum possible value of the bit length of the feedback information is more than or equal to the upper limit of the bit length that can be carried by the at least one candidate channel resource set, the target PUCCH resource set may be determined according to a relationship between the first bit length and the upper limit of the bit length that can be carried by the at least one candidate channel resource set.

For example, if the first bit length is more than or equal to the upper limit of the bit length that can be carried by the at least one candidate channel resource set, the candidate PUCCH resource set corresponding to the bit length range where the bit length of the part of information in the first UCI is located is determined as the target channel resource set. In such case, the part of information in the first UCI includes the ACK/NACK and/or the SR. The set capable of carrying the largest bit length in the at least one candidate channel resource set may also be determined as the target channel resource set.

It is to be noted that, in a specific implementation process, the operation that the target channel resource set from the at least one candidate channel resource set is determined according to the first bit length and/or the second bit length may be implemented according to the following cases. In the following cases, it is set that the first bit length is $N_{A/N/SR}+N_{part1}$, $N_{A/N/SR}$ being a bit length of the ACK/NACK/SR (if existing), i.e., the bit length of the part of information in the first UCI in the foregoing implementation, and $N_{part1}$ being a bit length of the part 1 CSI. It is set that the maximum value in the value range of the bit length of the second part of information is $N_{part2,max}$. It is set that the minimum value in the value range of the bit length of the second part of information is $N_{part2,min}$ and it is set that the upper limit of the bit length that can be carried by the at least one candidate channel resource set is $N_{x,max}$. The cases are specifically as follows.

Case 1

The UE determines the target channel resource set based on $N_{A/N/SR}+N_{part1}+N_{part2,max}$.

Case 2

The UE determines the target channel resource set based on $N_{A/N/SR}+N_{part1}+N_{part2,min}$.

Case 3

The UE determines the target channel resource set based on $N_{A/N/SR}+N_{part1}$.

Case 4

The UE compares $N_{A/N/SR}+N_{part1}+N_{part2,min}$ and $N_{x,max}$.

If $N_{A/N/SR}+N_{part1}+N_{part2,min}$ is more than or equal to $N_{x,max}$, the target channel resource set is determined based on $N_{A/N/SR}+N_{part1}$.

Otherwise the target channel resource set is determined based on $N_{A/N/SR}+N_{part1}+N_{part2,min}$.

Case 5

The UE compares $N_{A/N/SR}+N_{part1}+N_{part2,max}$ and $N_{x,max}$.

If $N_{A/N/SR}+N_{par}+N_{part2,max}$ is less than or equal to $N_{x,max}$, the target channel resource set is determined based on $N_{A/N/SR}+N_{part1}+N_{part2,max}$.

Otherwise $N_{A/N/SR}+N_{part1}+N_{part2,min}$ is compared with $N_{x,max}$.

If $N_{A/N/SR}+N_{part1}+N_{part2,min}$ is less than or equal to $N_{x,max}$, the target channel resource set is determined based on $N_{A/N/SR}+N_{part1}+N_{part2,min}$.

Otherwise the target channel resource set may be determined according to any one of the following two manners.

A First Manner $N_{A/N/SR}+N_{part1}$ is compared with $N_{x,max}$.

If $N_{A/N/SR}+N_{part1}$ is less than or equal to $N_{x,max}$, the target channel resource set is determined based on $N_{A/N/SR}+N_{part1}$.

Otherwise the target channel resource set is determined based on $N_{A/N/SR}$.

A Second Manner

If $N_{A/N/SR}+N_{part1}$ is less than or equal to $N_{x,max}$, the set capable of carrying the largest bit length in the at least one candidate channel resource set is determined as the target channel resource set. Generally speaking, the last PUCCH resource set configured for the UE by the base station may be considered as the PUCCH resource set capable of carrying the largest bit length in the candidate PUCCH resource sets.

The abovementioned implementations elaborate a process for determining the target channel resource set in detail. It can be understood that the base station, after acquiring the target channel resource set determined by the UE in the same manner, may comprehend the target channel resource set in the same manner as the UE, so that the circumstance of different comprehension is avoided.

For the technical solution shown in FIG. 2, the operation that the third part of information is transmitted in the target channel in the target channel resource set may specifically be implemented by the following operation.

The target channel in the target channel resource set is determined as a channel for transmission of the third part of information according to an ACK Resource Indication (ARI) information field of DCI.

The embodiment provides the method for determining a channel resource. The UE, after determining the target channel resource set according to the first bit length and/or second bit length in the feedback information, transmits the subset or complete set of the feedback information in the target channel in the target channel resource set. The base station may determine the target channel resource set used by the UE to transmit the subset or complete set of the feedback information according to the abovementioned process and determine the target channel based on the target channel resource set to receive the subset or complete set of the feedback information from the UE. Therefore, the circumstance of different comprehension of the base station and the UE to the channel resource set is avoided.

Second Embodiment

Figure 3:
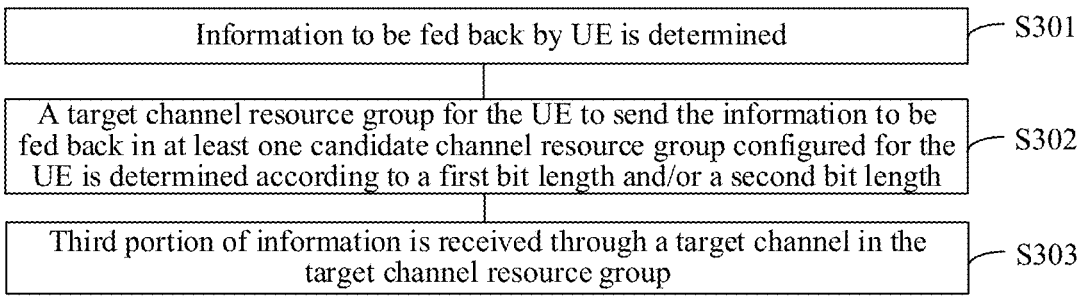
FIG. 3 is a flowchart of another method for determining a channel resource according to an embodiment of the disclosure.

Based on the same inventive concept as that in the abovementioned embodiment, referring to FIG. 3, a method for determining a channel resource provided in the embodiment of the disclosure is shown. The method may be applied to a network device, specifically the base station shown in FIG. 1. The method may include the following operations.

In S301, feedback information of UE is determined.

The feedback information includes a first part of information and a second part of information. A bit length of the first part of information is invariable, and a bit length of the second part of information is variable.

In S302, a target channel resource set for the UE to send the feedback information from at least one candidate channel resource set configured for the UE is determined according to a first bit length and/or a second bit length.

The first bit length is the bit length of the first part of information, and the second bit length is a bit length value in a value range of the bit length of the second part of information.

In S303, third part of information is received based on a target channel in the target channel resource set.

The third part of information is a subset or complete set of the feedback information.

It can be seen from the technical solution shown in FIG. 3 that the process that the base station determines the target channel resource set corresponds to the process that the UE determines the target channel resource set in the first embodiment, so that the base station may learn about the target channel resource set determined by the UE to send the third part of information, and the circumstance of different comprehension of the base station and the UE to the channel resource set is avoided.

For the technical solution shown in FIG. 3, the feedback information includes UCI and a check code of the UCI. The UCI includes a first UCI and a second UCI, the first part of information includes the first UCI and the check code of the UCI, and the second part of information includes the second UCI. The first UCI includes at least one of: an ACK/NACK, an SR or a part 1 CSI. Correspondingly, the second UCI includes a part 2 CSI. Information in the part 1 CSI and the part 2 CSI may refer to the contents elaborated with reference to FIG. 1 and elaborations are omitted herein.

For the technical solution shown in FIG. 3, in a possible implementation, the operation that the target channel resource set for the UE to send the feedback information from the at least one candidate channel resource set configured for the UE is determined according to the first bit length and/or the second bit length includes the following operations.

The target channel resource set from the at least one candidate channel resource set is determined based on the first bit length.

Alternatively, the target channel resource set from the at least one candidate channel resource set is determined based on a sum of the first bit length and the second bit length.

In the implementation, the operation that the target channel resource set for the UE to send the feedback information from the at least one candidate channel resource set configured for the UE is determined according to the first bit length and/or the second bit length includes the following operations.

The target channel resource set from the at least one candidate channel resource set is determined based on the first bit length and a maximum value in the value range of the bit length of the second part of information.

The target channel resource set from the at least one candidate channel resource set is determined based on the first bit length and a minimum value in the value range of the bit length of the second part of information.

For the technical solution shown in FIG. 3, in a possible implementation, the operation that the target channel resource set for the UE to send the feedback information from the at least one candidate channel resource set configured for the UE is determined according to the first bit length and/or the second bit length includes the following operations.

If a sum of the first bit length and the minimum value in the value range of the bit length of the second part of information is more than or equal to an upper limit of a bit length that can be carried by the at least one candidate channel resource set, the set capable of carrying a largest bit length in the at least one candidate channel resource set is determined as the target channel resource set.

Alternatively, if the sum of the first bit length and the minimum value in the value range of the bit length of the second part of information is less than or equal to the upper limit of the bit length that can be carried by the at least one candidate channel resource set, the target channel resource set from the at least one candidate channel resource set is determined based on the sum of the first bit length and the minimum value in the value range of the bit length of the second part of information.

For the technical solution shown in FIG. 3, in a possible implementation, the operation that the target channel resource set for the UE to send the feedback information from the at least one candidate channel resource set configured for the UE is determined according to the first bit length and/or the second bit length includes the following operation.

If a sum of the first bit length and the maximum value in the value range of the bit length of the second part of information is less than or equal to the upper limit of the bit length that can be carried by the at least one candidate channel resource set, the target channel resource set from the at least one candidate channel resource set is determined based on the sum of the first bit length and the maximum value in the value range of the bit length of the second part of information.

For the technical solution shown in FIG. 3, in a possible implementation, the operation that the target channel resource set for the UE to send the feedback information from the at least one candidate channel resource set configured for the UE is determined according to the first bit length and/or the second bit length includes the following operation.

If the sum of the first bit length and the maximum value in the value range of the bit length of the second part of information is more than or equal to the upper limit of the bit length that can be carried by the at least one candidate channel resource set and the sum of the first bit length and the minimum value in the value range of the bit length of the second part of information is less than or equal to the upper limit of the bit length that can be carried by the at least one candidate channel resource set, the target channel resource set from the at least one candidate channel resource set is determined based on the sum of the first bit length and the minimum value in the value range of the bit length of the second part of information.

For the technical solution shown in FIG. 3, in a possible implementation, the operation that the target channel resource set for the UE to send the feedback information from the at least one candidate channel resource set configured for the UE is determined according to the first bit length and/or the second bit length includes the following operation.

If the sum of the first bit length and the minimum value in the value range of the bit length of the second part of information is more than or equal to the upper limit of the bit length that can be carried by the at least one candidate channel resource set and the first bit length is more than or equal to the upper limit of the bit length that can be carried by the at least one candidate channel resource set, the set capable of carrying the largest bit length in the at least one candidate channel resource set is determined as the target channel resource set.

For the technical solution shown in FIG. 3, in a possible implementation, the operation that the target channel resource set for the UE to send the feedback information from the at least one candidate channel resource set configured for the UE is determined according to the first bit length and/or the second bit length includes the following operation.

If the sum of the first bit length and the minimum value in the value range of the bit length of the second part of information is more than or equal to the upper limit of the bit length that can be carried by the at least one candidate channel resource set and the first bit length is less than or equal to the upper limit of the bit length that can be carried by the at least one candidate channel resource set, the target channel resource set from the at least one candidate channel resource set is determined based on the first bit length.

For the technical solution shown in FIG. 3, in a possible implementation, the operation that the target channel resource set for the UE to send the feedback information from the at least one candidate channel resource set configured for the UE is determined according to the first bit length and/or the second bit length includes the following operations.

If the sum of the first bit length and the minimum value in the value range of the bit length of the second part of information is more than or equal to the upper limit of the bit length that can be carried by the at least one candidate channel resource set and the first bit length is more than or equal to the upper limit of the bit length that can be carried by the at least one candidate channel resource set, the target channel resource set from the at least one candidate channel resource set is determined based on a bit length of part of information in the first UCI, the part of information in the first UCI including the ACK/NACK and/or the SR.

Alternatively, if the sum of the first bit length and the minimum value in the value range of the bit length of the second part of information is more than or equal to the upper limit of the bit length that can be carried by the at least one candidate channel resource set and the first bit length is more than or equal to the upper limit of the bit length that can be carried by the at least one candidate channel resource set, the set capable of carrying the largest bit length in the at least one candidate channel resource set is determined as the target channel resource set.

It can be understood that specific processes of the abovementioned possible implementations may refer to the corresponding implementations in the first embodiment and elaborations thereof are omitted in the embodiment.

Third Embodiment

Figure 4:
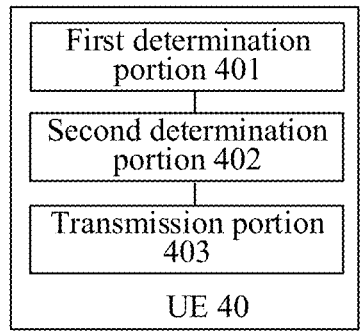
FIG. 4 is a schematic structural diagram of UE according to an embodiment of the disclosure.

Based on the same inventive concept as that in the abovementioned embodiments, referring to FIG. 4, UE 40 provided in the embodiment of the disclosure is shown. The UE includes a first determination portion 401, a second determination portion 402 and a transmission portion 403.

The first determination portion 401 is configured to determine feedback information that will be transmitted in a target channel. The feedback information includes a first part of information and a second part of information. A bit length of the first part of information is invariable and a bit length of the second part of information is variable.

The second determination portion 402 is configured to determine a target channel resource set from at least one candidate channel resource set according to a first bit length and/or a second bit length. The first bit length is the bit length of the first part of information and the second bit length is a bit length value in a value range of the bit length of the second part of information.

The transmission portion 403 is configured to transmit third part of information in the target channel in the target channel resource set. The third part of information is a subset or complete set of the feedback information.

In the solution, the feedback information includes UCI and a check code of the UCI. The UCI includes a first UCI and a second UCI, the first part of information includes the first UCI and the check code of the UCI, and the second part of information includes the second UCI. The first UCI includes at least one of:

an ACK/NACK, an SR or a part 1 CSI.

In the solution, the second UCI includes a part 2 CSI.

In the solution, the second determination portion 402 is configured to determine the target channel resource set from the at least one candidate channel resource set based on the first bit length.

Alternatively, the second determination portion 402 is configured to determine the target channel resource set from the at least one candidate channel resource set based on a sum of the first bit length and the second bit length.

In the solution, the second determination portion 402 is configured to determine the target channel resource set from the at least one candidate channel resource set based on the first bit length and a maximum value in the value range of the bit length of the second part of information.

The second determination portion 402 is configured to determine the target channel resource set from the at least one candidate channel resource set based on the first bit length and a minimum value in the value range of the bit length of the second part of information.

In the solution, the second determination portion 402 is configured to, if a sum of the first bit length and the minimum value in the value range of the bit length of the second part of information is more than or equal to an upper limit of a bit length that can be carried by the at least one candidate channel resource set, determine the set capable of carrying a largest bit length in the at least one candidate channel resource set as the target channel resource set.

Alternatively, the second determination portion 402 is configured to, if the sum of the first bit length and the minimum value in the value range of the bit length of the second part of information is less than or equal to the upper limit of the bit length that can be carried by the at least one candidate channel resource set, determine the target channel resource set from the at least one candidate channel resource set based on the sum of the first bit length and the minimum value in the value range of the bit length of the second part of information.

In the solution, the second determination portion 402 is configured to, if a sum of the first bit length and the maximum value in the value range of the bit length of the second part of information is less than or equal to the upper limit of the bit length that can be carried by the at least one candidate channel resource set, determine the target channel resource set from the at least one candidate channel resource set based on the sum of the first bit length and the maximum value in the value range of the bit length of the second part of information.

In the solution, the second determination portion 402 is configured to, if the sum of the first bit length and the maximum value in the value range of the bit length of the second part of information is more than or equal to the upper limit of the bit length that can be carried by the at least one candidate channel resource set and the sum of the first bit length and the minimum value in the value range of the bit length of the second part of information is less than or equal to the upper limit of the bit length that can be carried by the at least one candidate channel resource set, determine the target channel resource set from the at least one candidate channel resource set based on the sum of the first bit length and the minimum value in the value range of the bit length of the second part of information.

In the solution, the second determination portion 402 is configured to, if the sum of the first bit length and the minimum value in the value range of the bit length of the second part of information is more than or equal to the upper limit of the bit length that can be carried by the at least one candidate channel resource set and the first bit length is more than or equal to the upper limit of the bit length that can be carried by the at least one candidate channel resource set, determine the set capable of carrying the largest bit length in the at least one candidate channel resource set as the target channel resource set.

In the solution, the second determination portion 402 is configured to, if the sum of the first bit length and the minimum value in the value range of the bit length of the second part of information is more than or equal to the upper limit of the bit length that can be carried by the at least one candidate channel resource set and the first bit length is less than or equal to the upper limit of the bit length that can be carried by the at least one candidate channel resource set, determine the target channel resource set from the at least one candidate channel resource set based on the first bit length.

In the solution, the second determination portion 402 is configured to, if the sum of the first bit length and the minimum value in the value range of the bit length of the second part of information is more than or equal to the upper limit of the bit length that can be carried by the at least one candidate channel resource set and the first bit length is more than or equal to the upper limit of the bit length that can be carried by the at least one candidate channel resource set, determine the target channel resource set from the at least one candidate channel resource set based on a bit length of part of information in the first UCI. The part of information in the first UCI includes the ACK/NACK and/or the SR.

Alternatively, the second determination portion 402 is configured to, if the sum of the first bit length and the minimum value in the value range of the bit length of the second part of information is more than or equal to the upper limit of the bit length that can be carried by the at least one candidate channel resource set and the first bit length is more than or equal to the upper limit of the bit length that can be carried by the at least one candidate channel resource set, determine the set capable of carrying the largest bit length in the at least one candidate channel resource set as the target channel resource set.

It can be understood that, in the embodiment, "portion" may be a portion of a circuit, a portion of a processor, a portion of a program or software and the like. Of course, it may also be a unit, a module, or it may be non-modular.

In addition, each component in the embodiment may be integrated into a processing unit, each unit may also exist independently, and two or more than two units may be integrated into a unit. The integrated unit may be implemented in a hardware form, or may be implemented in form of software function module.

When implemented in form of software function module and sold or used as an independent product, the integrated unit may be stored in a computer-readable storage medium. Based on such an understanding, the technical solution of the embodiment substantially or parts thereof making contributions to the conventional art or all or part of the technical solution may be embodied in form of software product, and the computer software product is stored in a storage medium, including a plurality of instructions configured to enable a computer device (which may be a personal computer, a server, a network device or the like) or a processor to execute all or part of the steps of the method in the embodiment. The storage medium includes: various media capable of storing program codes such as a U disk, a mobile hard disk, a Read Only Memory (ROM), a Random Access Memory (RAM), a magnetic disk or an optical disk.

Therefore, the embodiment provides a computer storage medium having stored therein a program for determining a channel resource that, when being executed by at least one processor, cause the processor to implement the steps of the method in the first embodiment.

Figure 5:
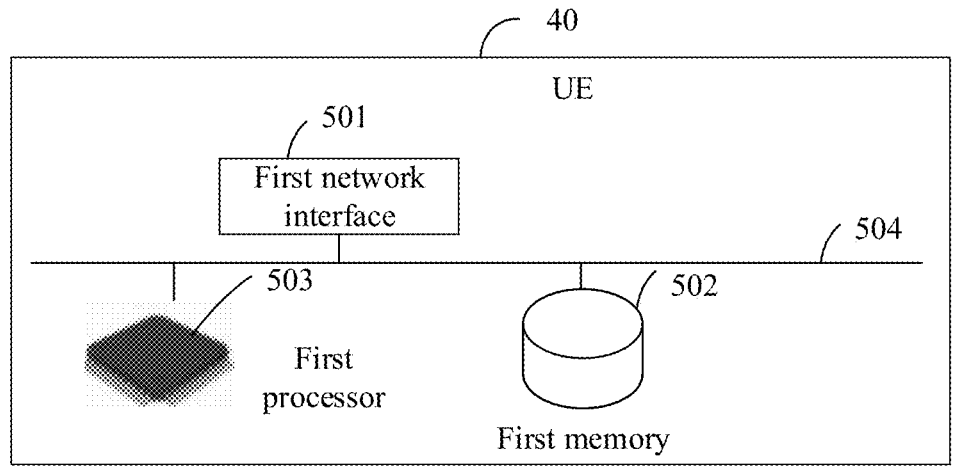
FIG. 5 is a schematic diagram showing a specific hardware structure of UE according to an embodiment of the disclosure.

Based on the UE 40 and the computer storage medium, referring to FIG. 5, a specific hardware structure of the UE 40 provided in the embodiment of the disclosure is shown. The UE may include a first network interface 501, a first memory 502 and a first processor 503. The various components are coupled together through a bus system 504. It can be understood that the bus system 504 is used to implement a connection and communication between these components. The bus system 504 includes a data bus, a power bus, a control bus and a state signal bus. However, for clear description, various buses in FIG. 5 are marked as the bus system 504. The first network interface 501 is configured to receive and send a signal in a process of receiving and sending information with another external network element.

The first memory 502 is configured to store a computer program capable of running in the first processor 503.

The first processor 503 is configured to run the computer program to execute the following operations.

Feedback information that will be transmitted in a target channel is determined. The feedback information includes a first part of information and a second part of information, a bit length of the first part of information is invariable and a bit length of the second part of information is variable.

A target channel resource set from at least one candidate channel resource set is determined according to a first bit length and/or a second bit length. The first bit length is the bit length of the first part of information and the second bit length is a bit length value in a value range of the bit length of the second part of information.

Third part of information is transmitted in the target channel in the target channel resource set. The third part of information is a subset or complete set of the feedback information.

It can be understood that the first memory 502 in the embodiment of the disclosure may be a volatile memory or a nonvolatile memory, or may include both the volatile and nonvolatile memories. The nonvolatile memory may be a ROM, a Programmable ROM (PROM), an Erasable PROM (EPROM), an Electrically EPROM (EEPROM) or a flash memory. The volatile memory may be a RAM, and is used as an external high-speed cache. By way of illustration and not by way of limitation, RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DRRAM). It is to be noted that the first memory 502 in the system and method described herein is intended to include, but not limited to, these and any other proper types of memory.

The first processor 503 may be an integrated circuit chip with a signal processing capability. In an implementation process, each step of the method may be completed by an integrated logic circuit in a hardware form in the first processor 503 or an instruction in a software form. The first processor 503 may be a general purpose processor, a Digital Signal Processor (DSP), an Application Specific Integrated Circuit (ASIC), a Field Programmable Gate Array (FPGA) or another Programmable Logic Device (PLD), discrete gate or transistor logical device and discrete hardware component. Each method, step and logical block diagram disclosed in the embodiment of the disclosure may be implemented or executed. The general purpose processor may be a microprocessor or the processor may also be any conventional processor and the like. The steps of the method disclosed in combination with the embodiment of the disclosure may be directly embodied to be executed and completed by a hardware decoding processor, or may be executed and completed by a combination of hardware and software modules in the decoding processor. The software module may be located in a mature storage medium in this field such as a RAM, a flash memory, a ROM, a PROM or EEPROM and a register. The storage medium is located in the first memory 502. The first processor 503 reads information in the first memory 502 and completes the steps of the method in combination with the hardware thereof.

It can be understood that these embodiments described in the disclosure may be implemented by hardware, software, firmware, middleware, a microcode or a combination thereof. In case of implementation with the hardware, the processing unit may be implemented in one or more ASICs, DSPs, DSP Devices (DSPDs), PLDs, FPGAs, general purpose processors, controllers, microcontrollers, microprocessors, other electronic units configured to execute the functions described herein or a combination thereof.

In case of implementation with the software, the technology described herein may be implemented through the modules (for example, processes and functions) for executing the functions in the disclosure. A software code may be stored in the memory and executed by the processor. The memory may be implemented in the processor or outside the processor.

Specifically, the first processor 503 in the UE 40 is further configured to run the computer program to execute the steps of the method in the first embodiment. Elaborations are omitted herein.

Fourth Embodiment

Figure 6:
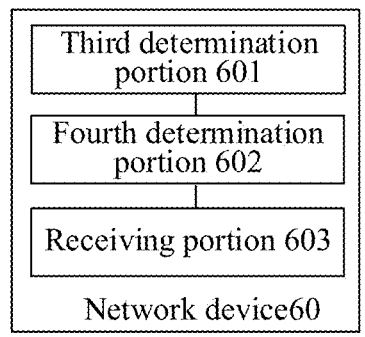
FIG. 6 is a schematic structural diagram of a network device according to an embodiment of the disclosure.

Based on the same inventive concept as that in the abovementioned embodiments, referring to FIG. 6, a composition of a network device 60 provided in the embodiment of the disclosure is shown. The network device 60 may specifically be the base station in the abovementioned embodiments. The network device 60 may include a third determination portion 601, a fourth determination portion 602 and a receiving portion 603.

The third determination portion 601 is configured to determine feedback information of UE. The feedback information includes a first part of information and a second part of information, a bit length of the first part of information is invariable and a bit length of the second part of information is variable.

The fourth determination portion 602 is configured to determine a target channel resource set for the UE to send the feedback information from at least one candidate channel resource set configured for the UE according to a first bit length and/or a second bit length. The first bit length is the bit length of the first part of information and the second bit length is a bit length value in a value range of the bit length of the second part of information.

The receiving portion 603 is configured to receive third part of information based on a target channel in the target channel resource set. The third part of information is a subset or complete set of the feedback information.

In the solution, the feedback information includes UCI and a check code of the UCI. The UCI includes a first UCI and a second UCI, the first part of information includes the first UCI and the check code of the UCI, and the second part of information includes the second UCI. The first UCI includes at least one of: an ACK/NACK, an SR or a part 1 CSI.

In the solution, the second UCI includes a part 2 CSI.

In the solution, the fourth determination portion 602 is configured to determine the target channel resource set from the at least one candidate channel resource set based on the first bit length.

Alternatively, the fourth determination portion 602 is configured to determine the target channel resource set from the at least one candidate channel resource set based on a sum of the first bit length and the second bit length.

In the solution, the fourth determination portion 602 is configured to determine the target channel resource set from the at least one candidate channel resource set based on the first bit length and a maximum value in the value range of the bit length of the second part of information.

The fourth determination portion 602 is configured to determine the target channel resource set from the at least one candidate channel resource set based on the first bit length and a minimum value in the value range of the bit length of the second part of information.

In the solution, the fourth determination portion 602 is configured to: if a sum of the first bit length and the minimum value in the value range of the bit length of the second part of information is more than or equal to an upper limit of a bit length that can be carried by the at least one candidate channel resource set, determine the set capable of carrying a largest bit length in the at least one candidate channel resource set as the target channel resource set.

Alternatively, the fourth determination portion 602 is configured to: if the sum of the first bit length and the minimum value in the value range of the bit length of the second part of information is less than or equal to the upper limit of the bit length that can be carried by the at least one candidate channel resource set, determine the target channel resource set from the at least one candidate channel resource set based on the sum of the first bit length and the minimum value in the value range of the bit length of the second part of information.

In the solution, the fourth determination portion 602 is configured to: if a sum of the first bit length and the maximum value in the value range of the bit length of the second part of information is less than or equal to the upper limit of the bit length that can be carried by the at least one candidate channel resource set, determine the target channel resource set from the at least one candidate channel resource set based on the sum of the first bit length and the maximum value in the value range of the bit length of the second part of information.

In the solution, the fourth determination portion 602 is configured to: if the sum of the first bit length and the maximum value in the value range of the bit length of the second part of information is more than or equal to the upper limit of the bit length that can be carried by the at least one candidate channel resource set and the sum of the first bit length and the minimum value in the value range of the bit length of the second part of information is less than or equal to the upper limit of the bit length that can be carried by the at least one candidate channel resource set, determine the target channel resource set from the at least one candidate channel resource set based on the sum of the first bit length and the minimum value in the value range of the bit length of the second part of information.

In the solution, the fourth determination portion 602 is configured to: if the sum of the first bit length and the minimum value in the value range of the bit length of the second part of information is more than or equal to the upper limit of the bit length that can be carried by the at least one candidate channel resource set and the first bit length is more than or equal to the upper limit of the bit length that can be carried by the at least one candidate channel resource set, determine the set capable of carrying the largest bit length in the at least one candidate channel resource set as the target channel resource set.

In the solution, the fourth determination portion 602 is configured to: if the sum of the first bit length and the minimum value in the value range of the bit length of the second part of information is more than or equal to the upper limit of the bit length that can be carried by the at least one candidate channel resource set and the first bit length is less than or equal to the upper limit of the bit length that can be carried by the at least one candidate channel resource set, determine the target channel resource set from the at least one candidate channel resource set based on the first bit length.

In the solution, the fourth determination portion 602 is configured to: if the sum of the first bit length and the minimum value in the value range of the bit length of the second part of information is more than or equal to the upper limit of the bit length that can be carried by the at least one candidate channel resource set and the first bit length is more than or equal to the upper limit of the bit length that can be carried by the at least one candidate channel resource set, determine the target channel resource set from the at least one candidate channel resource set based on a bit length of part of information in the first UCI. The part of information in the first UCI includes the ACK/NACK and/or the SR.

Alternatively, the fourth determination portion 602 is configured to: if the sum of the first bit length and the minimum value in the value range of the bit length of the second part of information is more than or equal to the upper limit of the bit length that can be carried by the at least one candidate channel resource set and the first bit length is more than or equal to the upper limit of the bit length that can be carried by the at least one candidate channel resource set, determine the set capable of carrying the largest bit length in the at least one candidate channel resource set as the target channel resource set.

In addition, the embodiment provides a computer storage medium having stored therein a program for determining a channel resource that, when being executed by at least one processor, cause the processor to implement the steps of the method in the second embodiment. Specific elaborations about the computer storage medium may refer to the descriptions in the third embodiment and are omitted herein.

Figure 7:
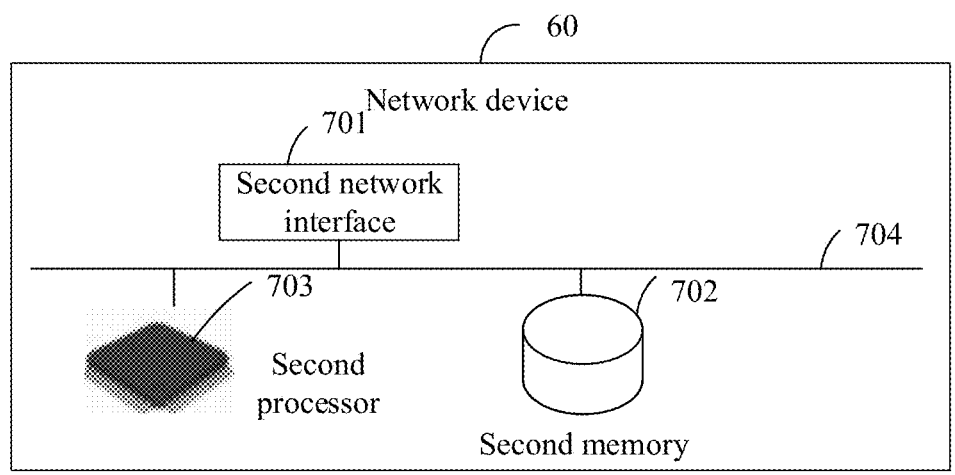
FIG. 7 is a schematic diagram showing a specific hardware structure of a network device according to an embodiment of the disclosure.

Based on the network device 60 and the computer storage medium, referring to FIG. 7, a specific hardware structure of the network device 60 provided in the embodiment of the disclosure is shown. The network device 60 may include a second network interface 701, a second memory 702 and a second processor 703. The various components are coupled together through a bus system 704. It can be understood that the bus system 704 is configured to implement a connection and communication between these components. The bus system 704 includes a data bus, a power bus, a control bus and a state signal bus. However, for clear description, various buses in FIG. 7 are marked as the bus system 704.

The second network interface 701 is configured to receive and send a signal in a process of receiving and sending information with another external network element.

The second memory 702 is configured to store a computer program capable of running in the second processor 703.

The second processor 703 is configured to run the computer program to execute the following operations.

UCI to be sent by UE is determined. The UCI to be sent includes a first UCI and a second UCI, a bit length of the first UCI is invariable and a bit length of the second UCI is variable.

A target channel resource set for the UE to send the feedback information from at least one candidate channel resource set configured for the UE is determined according to a first bit length and/or a second bit length. The first bit length is the bit length of the first part of information and the second bit length is a bit length value in a value range of the bit length of the second part of information.

Third part of information is received based on a target channel in the target channel resource set. The third part of information is a subset or complete set of the feedback information.

It can be understood that components in the specific hardware structure of the network device 60 in the embodiment are similar to the corresponding components in the third embodiment and will not be elaborated herein.

Specifically, the second processor 703 in the network device 60 is further configured to run the computer program to execute the steps of the method in the second embodiment.

Elaborations are omitted herein.

Described above are merely the preferred embodiments of the disclosure and not intended to limit the scope of protection of the disclosure.

INDUSTRIAL APPLICABILITY

The embodiments of the disclosure provide the method for determining a channel resource, the device and the computer storage medium. The UE determines the target channel resource set in the configured candidate channel resource set and then transmits the subset or complete set of the feedback information in the target channel in the target channel resource set. The base station may determine the target channel resource set used by the UE to transmit the subset or complete set of the feedback information according to the abovementioned process, and determine the target channel based on the target channel resource set to receive the subset or complete set of the feedback information from the UE. Therefore, the circumstance of different comprehension of the base station and the UE to the channel resource set is avoided.

The invention claimed is:

1. An apparatus in wireless communication, comprising a network interface, a memory, and a processor, wherein the processor is configured to run a computer program stored in the memory to:
   determine a target Physical Uplink Control Channel (PUCCH) resource set from at least one candidate PUCCH resource set in accordance with a number of Uplink Control Information (UCI) bit for uplink transmission;
   obtain a target PUCCH resource from the target PUCCH resource set; and
   control the network interface to transmit a subset of a UCI corresponding to the number of the UCI bit in the target PUCCH resource in the target PUCCH resource set,
   wherein the number of the UCI bit comprises: a number of a first part of information bit and a value in a value range, with multiple values, of a number of a second part of information bit, and the processor is configured to run the computer program stored in the memory to:
   when a total number of the first part of information bit and a maximum value in the value range of the number of the second part of information bit is less than or equal to an upper limit of a bit length that can be carried by the at least one candidate PUCCH resource set, determine the target PUCCH resource set from the at least one candidate PUCCH resource set based on the total number of the first part of information bit and the maximum value in the value range of the number of the second part of information bit;

when the total number of the first part of information bit and the maximum value in the value range of the number of the second part of information bit is more than the upper limit of the bit length that can be carried by the at least one candidate PUCCH resource set and a total number of the first part of information bit and a minimum value in the value range of the number of the second part of information bit is less than or equal to the upper limit of the bit length that can be carried by the at least one candidate PUCCH resource set: determine the target PUCCH resource set from the at least one candidate PUCCH resource set based on the total number of the first part of information bit and the minimum value in the value range of the number of the second part of information bit; and wherein the UCI corresponding to the number of the UCI bit comprises: a first part of information and a second part of information.

2. The apparatus of claim 1, wherein the first part of information comprises a first UCI, and the first UCI comprises at least one of: an Acknowledgment (ACK)/Negative Acknowledgment (NACK), a Scheduling Request (SR) or a part 1 Channel State Information (CSI); and the second part of information comprises a second UCI, and the second UCI comprises a part 2 CSI.

3. The apparatus of claim 2, wherein the first part of information further comprises: a check code of the UCI.

4. A method for determining a channel resource, comprising:

determining a target Physical Uplink Control Channel (PUCCH) resource set from at least one candidate PUCCH resource set in accordance with a number of Uplink Control Information (UCI) bit for uplink transmission;

obtaining a target PUCCH resource from the target PUCCH resource set; and transmitting a subset of a UCI corresponding to the number of the UCI bit in the target PUCCH resource in the target PUCCH resource set, wherein the number of the UCI bit comprises: a number of a first part of information bit and a value in a value range, with multiple values, of a number of a second part of information bit, wherein the total number of the determining the target PUCCH resource set from the at least one candidate PUCCH resource set in accordance with the number of UCI bit for uplink transmission comprises:

when a total number of the first part of information bit and a maximum value in the value range of the number of the second part of information bit is less than or equal to an upper limit of a bit length that can be carried by the at least one candidate PUCCH resource set, determining the target PUCCH resource set from the at least one candidate PUCCH resource set based on the total number of the first part of information bit and the maximum value in the value range of the number of the second part of information bit when the total number of the first part of information bit and the maximum value in the value range of the number of the second part of information bit is more than the upper limit of the bit length that can be carried by the at least one candidate PUCCH resource set and a total number of the first part of information bit and a minimum value in the value range of the number of the second part of information bit is less than or equal to the upper limit of the bit length that can be carried by the at least one candidate PUCCH resource set:

determining the target PUCCH resource set from the at least one candidate PUCCH resource set based on the total number of the first part of information bit and the minimum value in the value range of the number of the second part of information bit; and wherein the UCI corresponding to the total number of the UCI bit comprises: a first part of information and a second part of information.

5. The method of claim 4, wherein the first part of information comprises a first UCI, and the first UCI comprises at least one of: an Acknowledgment (ACK)/Negative Acknowledgment (NACK), a Scheduling Request (SR) or a part 1 Channel State Information (CSI); and the second part of information comprises a second UCI, and the second UCI comprises a part 2 CSI.

6. The method of claim 5, wherein the first part of information further comprises: a check code of the UCI.

7. The method of claim 5, wherein determining the target PUCCH resource set comprises:

if the total number of the first part of information bit and the maximum value in the value range of the number of the second part of information bit is more than the upper limit of the bit length that can be carried by the at least one candidate PUCCH resource set and the total number of the first part of information bit and the minimum value in the value range of the number of the second part of information bit is more than the upper limit of the bit length that can be carried by the at least one candidate PUCCH resource set, and if the number of the first part of information bit is more than the upper limit of the bit length that can be carried by the at least one candidate PUCCH resource set:

determining the set capable of carrying a largest bit length in the at least one candidate PUCCH resource set as the target PUCCH resource set.

8. The method of claim 4, wherein determining the target PUCCH resource set comprises:

if the total number of the first part of information bit and the maximum value in the value range of the number of the second part of information bit is more than the upper limit of the bit length that can be carried by the at least one candidate PUCCH resource set, the total number of the first part of information bit and the minimum value in the value range of the number of the second part of information bit is more than the upper limit of the bit length that can be carried by the at least one candidate PUCCH resource set, and if the number of the first part of information bit is less than or equal to the upper limit of the bit length that can be carried by the at least one candidate PUCCH resource set:

determining the target PUCCH resource set from the at least one candidate PUCCH resource set based on the number of the first part of information bit.

9. The method of claim 4, wherein determining the target PUCCH resource set comprises:

if the total number of the first part of information bit and the maximum value in the value range of the number of the second part of information bit is more than the upper limit of the bit length that can be carried by the at least one candidate PUCCH resource set, theft total number of the first part of information bit and the minimum value in the value range of the number of the second part of information bit is more than the upper limit of the bit length that can be carried by the at least one candidate PUCCH resource set, and if the number of the first part of information bit is more than the upper limit of the bit length that can be carried by the at least one candidate PUCCH resource set:

determining the target PUCCH resource set from the at least one candidate PUCCH resource set based on a bit length of portion of information in a first UCI, the portion of information in the first UCI comprising at least one of the ACK/NACK or the SR.

* * * * *